S. JOHNSTON.
Combined Rake and Reel for Harvesters.
No. 46,300. Patented Feb. 7, 1865.
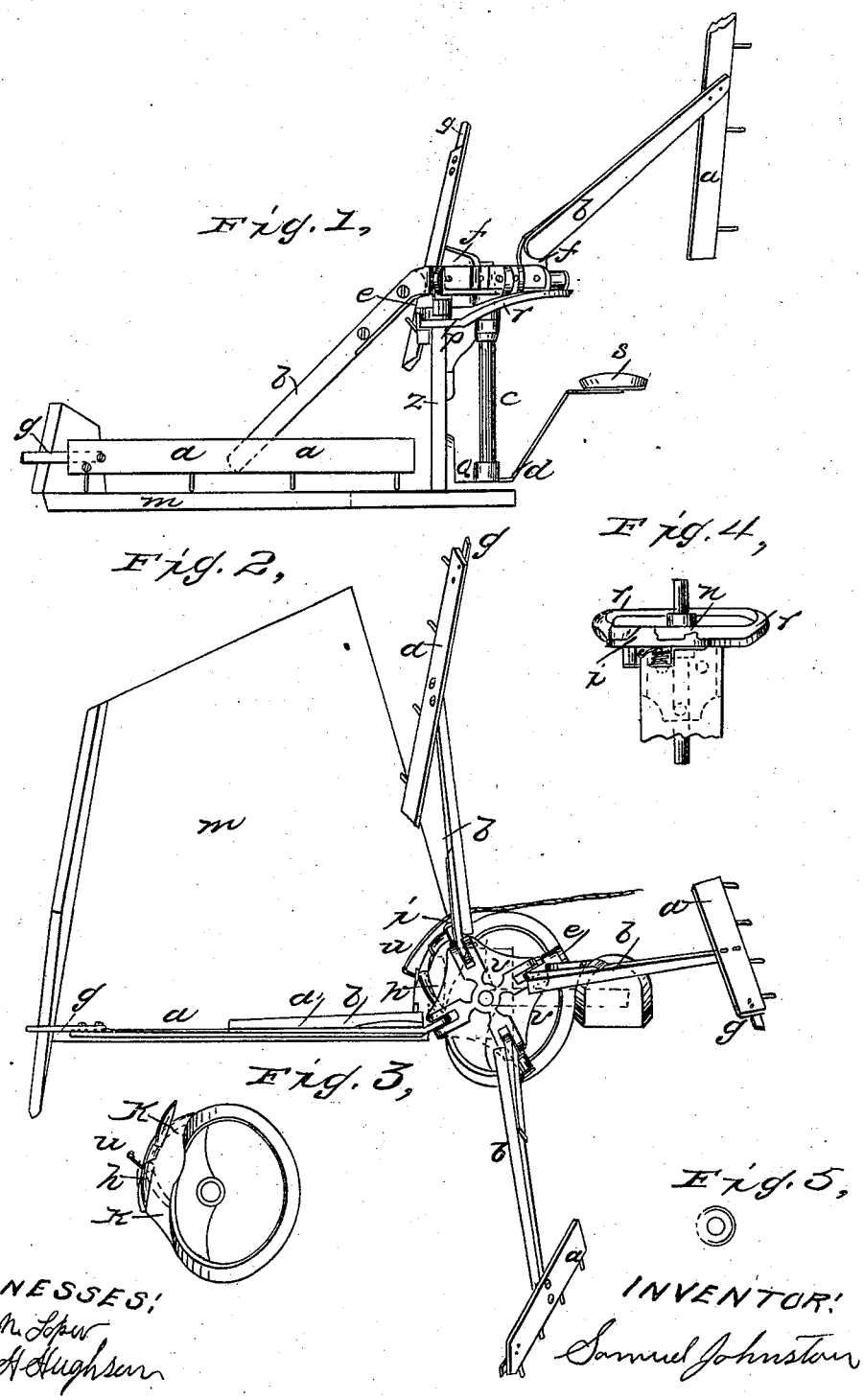

UNITED STATES PATENT OFFICE.

SAMUEL JOHNSTON, OF BUFFALO, NEW YORK, ASSIGNOR TO HIMSELF AND RUFUS L. HOWARD, OF SAME PLACE.

IMPROVEMENT IN COMBINED RAKES AND REELS FOR HARVESTERS.

Specification forming part of Letters Patent No. 46,300, dated February 7, 1865.

*To all whom it may concern:*

Be it known that I, SAMUEL JOHNSTON, of the city of Buffalo, in the county of Erie and State of New York, have invented a new and Improved Combined Reel and Self-Rake for Harvesters; and the following is a correct description thereof, reference being had to the drawings and the letters of reference marked thereon.

To enable others to make and use my invention, I will proceed to describe its construction and operation.

The nature of my invention consists not merely in an improved construction, which is very simple and renders it cheap to manufacture, but principally in remedying defects and supplying wants which, in this class of machines, have prevented their coming into general practical use.

It consists—

First, in constructing a self rake and reel combined for harvesters in such a manner that the operator can at pleasure, without stopping either the machine or the operation of the reel, drop either one or all of the rakes down to the platform to remove a sheaf whenever sufficient grain has been deposited, by means of the arrangement of the two tracks or ways, the spring-gate, and the lever and cord attached thereto, which are hereinafter described.

Second, in an arrangement of the working parts so that each rake or rake-head, when operating simply as a reel, shall drop down nearly to the cutters and remove the grain back from them sufficiently to prevent them being clogged before a sufficient quantity of cut grain has been deposited upon the platform for a sheaf, then rise up and pass over the grain thus deposited.

Third, in the device for bringing the cut grain upon the platform at the outer end of the rake, which, in the rakes in use, has not been reached, as the rake revolving on a vertical shaft placed upon the inside of the platform must be made short enough to pass around on the platform, and thus would not reach all the grain that the divider gathered in. I remedy this defect by a hinged extension of the rake-head, which will reach all the grain to be cut and deposit it upon the platform, and still allow the rake-head to drop down to rake the grain off, and the hinged extension will rise and slide over the end board of the platform.

My combined reel and self-rake can be attached to most of the harvesters in use by any skillful mechanic in such a manner that the movement of the machine shall operate the rake. It may be operated by means of gearing attached to the machine and to the shaft C of my rake; but as I do not claim anything new in the mode of attachment, and as it may be attached in different ways to different machines, depending somewhat upon their construction, I have not shown any particular way.

I make a platform to receive the cut grain, which is lettered *m* in the ordinary form, suitable for the operation of an automatic rake. On the inner front end of the platform I attach a perpendicular standard—it may be of wood or iron—(marked letter *l*,) about three feet high, and the same is held to the platform by a casting in an elbow form, letter *o*, with a bearing, letter *p*, for the lower end of the shaft *c*. Upon the top of the standard is attached the way or track upon which the rake revolves, letter *r*. This is a casting circular in its form, and upon the inner end or side of it nearest to the platform are arranged two tracks, on which the elbow of the rake moves, the outer track so arranged as to elevate the rake and the outer ring part still rising, so as to carry the rake over the head of the driver seated on the seat *s*. The inner track has two gates, the forward gate arranged with a spring to close the same after the roller on the end of the elbow of the rake has passed through. This spring is lettered *t*, and has a lever with a cord under the control of the driver, so that the driver can open the gate whenever sufficient grain is deposited on the platform for a bundle, to allow the elbow of the rake to pass through, when the rake falls upon the platform and sweeps the cut grain off, and the same is deposited at the side, out of the way for cutting the next swath, and this operation of raking can be repeated as often as desired; and whenever there is not sufficient cut grain upon the platform to form a bundle this gate is not opened, and the elbow of the rake passes over the outer track, and this elevates it sufficiently to pass over the grain lying on the platform; and the rear gate, now closed or being closed by the elbow of the rake, forms part of this outer track; but when the elbow passes through the front spring-gate it passes out through the rear gate, which will be closed whenever the rake passes over the outer track.

The roller upon the end of the elbow of the rake is lettered e, and the front gate is shown in Fig. 2 by letter h, and the rear gate by letter i, both closed, and in Fig. 3 by the same letters, and both open. The lever and cord by which the spring-gate h is opened is shown by letter u in Fig. 2.

The rear gate may be arranged with a spring for the purpose of closing the same.

Whenever desired, and the grain is suitable, the cord attached to the lever to open the front gate may be fastened to the driver's seat, or any convenient place, and the gate kept open, so as to reel and rake at every revolution, and the heads of the rake may be taken off from two or more of the arms, so that they shall not operate as rakes; or the teeth may be removed from two or more rakes, so that the same shall operate as a reel, but not as a rake. This circular track or way has a hub or bearing in the center, in which the shaft c revolves, and a casting, v v v, is attached to the top of the same, in which are four openings or slots, in which the elbow of the arm b is fastened. This elbow is lettered f in Fig. 1, and is fastened by a pin in the slot to allow of the rake rising and falling, and the rake sweeps forward into the grain and brings it to the cutters and upon the platform and serves the double purpose of a reel and rake.

In case it is necessary to use all of the four rakes, the heads of the rakes not used will still serve the purpose of a reel.

In cutting grain there is often some difficulty of sweeping in the grain and raking it off upon the outer side of the platform, and I remedy the difficulty by attaching to the outer end of the rake-head a hinged arm extending beyond the sides of the platform a few inches, hinged so that the same will rise, but having a stop, so that it shall not fall below the line of the rake-head.

This is attached to the back side of the rake-head, and its weight will always bring it down to the stop when not held by the sides of the platform or by the grain.

I attach a seat for the driver of the machine on the left side, and so arranged that the rake will pass over the driver. On the bottom of the rollers, attached to the elbow of the rake-arm, I attach a pointed flat-iron-shaped plate or washer, Fig. 5, which is important to prevent the roller from striking against the forward gate in entering in case the gate should not be opened sufficiently wide to allow of its entrance; but this wedge-shaped point prevents all difficulty in this respect.

In a harvesting-machine combining a reel and automatic rake in which is embraced the important feature of being able to suspend the operation of either of the rakes at pleasure, it is indispensable that the operator of the machine should be located thereon, and I have so arranged a seat for this purpose that the rake shall in its revolutions sweep above him and not incommode him.

Having thus described my invention, what I claim, and desire to secure by Letters Patent, are the following:

1. Making an automatic rake and reel combined, so that the operator can, by means of a lever and cord and the arrangement of two tracks or ways in which the elbow of the rake moves, cause either rake-head to operate at pleasure as a rake, and at the same time act continuously as a reel, all constructed in the manner herein described, and substantially as and for the purposes set forth.

2. In an automatic rake and reel combined for harvesting-machines, the arrangement whereby the operator, without stopping the action of reeling, can drop either of the rake-heads down to the platform and hold it thereon while removing the grain therefrom, constructed substantially as described, and for the purposes set forth.

3. The arrangement of the tracks or ways when they are arranged so that, in reeling, the rake or rake-head will drop down nearly to the cutters and move the cut grain back from them, and then rise up and pass over the cut grain, substantially as described, and as and for the purposes set forth.

4. The arrangement of the driver's seat in connection with the lever, cord, and gate, substantially as described, and for the purposes set forth.

5. In a combined automatic rake and reel, changing the path of the roller which controls the motions of the rake when it is removing the grain from the platform, substantially as described, and for the purposes herein set forth.

6. The arrangement of two tracks or ways in combination with the gates or switches, for the purposes herein set forth.

7. The lever and spring attached to the forward gate in connection with the cord for operating the same, for the purposes set forth.

8. The use of the pointed washer attached to the elbow of the rake below the roller, for the purposes set forth.

9. The hinged extension attached to the outer end of the rake-head, applied substantially as described, and for the purposes set forth.

10. The combination of the elbow of the rake-head with the roller and the outer and inner tracks or ways, constructed substantially as described, and for the purposes set forth.

Dated November 3, 1864.

SAMUEL JOHNSTON.

Witnesses:
GIB. F. HOWARD,
GEO. H. HUGHSON.